United States Patent [19]
Kent

[11] Patent Number: 5,811,493
[45] Date of Patent: Sep. 22, 1998

[54] PAPER-LIKE FILM

[75] Inventor: Susan L. Kent, Shorewood, Minn.

[73] Assignee: Minnesota Mining and Manufacturing Company, St. Paul, Minn.

[21] Appl. No.: 327,488

[22] Filed: Oct. 21, 1994

[51] Int. Cl.$^6$ ................................................ C08L 67/00
[52] U.S. Cl. ................................ 525/92 F; 521/138
[58] Field of Search ........................... 525/92 F; 521/138

[56] References Cited

U.S. PATENT DOCUMENTS

| | | | |
|---|---|---|---|
| 3,579,609 | 5/1971 | Sevenich | 525/177 |
| 3,944,699 | 3/1976 | Mathews et al. | 428/220 |
| 4,368,295 | 1/1983 | Newton et al. | 525/166 |
| 4,377,616 | 3/1983 | Ashcraft et al. | 428/213 |
| 4,615,941 | 10/1986 | Lu | 428/327 |
| 4,615,942 | 10/1986 | Lu | 428/327 |
| 4,771,108 | 9/1988 | Mackenzie | 525/92 F |
| 4,871,784 | 10/1989 | Otonari et al. | 521/138 |
| 4,968,464 | 11/1990 | Kojoh et al. | 264/41 |
| 5,084,334 | 1/1992 | Hamano et al. | 428/304.4 |
| 5,194,468 | 3/1993 | Absu-Isa et al. | 524/128 |

FOREIGN PATENT DOCUMENTS

| | | |
|---|---|---|
| 0 451 797 A2 | 4/1991 | European Pat. Off. . |
| A0 443 736 | 8/1991 | European Pat. Off. . |
| A04 122 736 | 4/1992 | Japan . |
| 6-226894 | 8/1994 | Japan . |
| 6-226937 | 8/1994 | Japan . |

*Primary Examiner*—Mark L. Warzel
*Attorney, Agent, or Firm*—John A. Fortkort

[57] ABSTRACT

Extrudable compositions comprising a thermoplastic polyester continuous phase, a thermoplastic polyolefin discrete phase, and a polyester-polyether, diblock, compatibilizer are disclosed. Voided films made from the composition are also disclosed. The voided films have paper-like texture and appearance.

31 Claims, 7 Drawing Sheets

Machine Direction ⟷    10 μm

Machine Direction ⟷    10 μm

Machine Direction ⬅➡  10 μm

10 μm

PAPER-LIKE FILM

This invention relates to compositions comprising a polyester continuous phase, a polyolefin discrete phase, and a third component. This invention also relates to voided films made from the compositions of this invention and to methods of making such voided films.

Polyester compositions, in particular, polyester films, are well-known important materials with many uses. Sometimes a minor amount of a second polymer is blended with the polyester to improve selected properties, for example, U.S. Pat. No. 3,579,609 (Sevenich) describes modified poly(ethylene terephthalate) film prepared from compositions comprising minor amounts of fusible, heat-stable homopolymers or copolymers of mono-alpha olefin blended with poly(ethylene-terephthalate) polymer.

A second component can be added to help prepare voided films. For example, U.S. Pat. No. 3,944,699 (Mathews et al.) discloses opaque voided films made from blends of a polyester with 3 to 27% of an ethylene or propylene polymer. See also, for example, European Patent Publication 451,797 (Hamano et al.). Other examples of voided films are described, for example, in U.S. Pat. No. 4,377,616 (Ashcraft et al.).

Sometimes a third component is added to the polymer blend. For example, U.S. Pat. No. 4,368,295 (Newton et al.) discloses film prepared from a composition comprising polyester, polyolefin, and carboxylated polyolefin additive. Such additive is said to allow more uniformly opaque or translucent films to be produced. See also U.S. Pat. No. 4,771,108 (Mackenzie).

U.S. Pat. No. 4,871,784 (Otonari et al.) discloses certain voided film comprising a polyester continuous phase, a polypropylene minor phase, and certain surface active agents.

U.S. Pat. No. 5,194,468 (Abu-Isa et al.) discloses certain thermoplastic blends comprising polyester and high density polyethylene. In one example, a thermoplastic elastomer was added but it was concluded that the addition of the elastomer did not enhance the compatibility of the blend.

Sometimes the polyester is the minor component in a polymer blend, with polyolefin as the major component, with or without a third component. See, for example, U.S. Pat. Nos. 4,615,941 (Lu) and 4,615,942 (Lu).

U.S. Pat. No. 4,968,464 (Kojoh et al.) discloses a process for producing a porous film containing a polyolefin resin as a main component, comprising melting a mixture of polyolefin, polyester-polyether thermoplastic elastomer, and thermoplastic polyester.

Briefly, in one aspect, the present invention provides an extrudable thermoplastic composition comprising a thermoplastic polyester continuous phase, a thermoplastic polyolefin discrete phase, and a polyester-polyether, diblock, compatibilizer stable at the extrusion temperature of the composition. Preferably, the ratio of the viscosity of said polyolefin to said polyester is close enough to 1.0 that the composition will not fibrillate during extrusion.

In another aspect, the present invention provides voided film comprising the composition of this invention.

This invention also provides a method for preparing a voided film comprising the steps of A) preparing the composition of this invention, B) extruding said composition into a film or sheet, and C) orienting said film or sheet to produce voids. Said preparation step can comprise mixing in an extruder utilizing conventional shear rates. Preferably, said compatibilizer is present at 1% or less by weight based on the total weight of said polyester and said polyolefin. More preferably, said compatibilizer is present at an amount sufficient to narrow the size distribution of the thermoplastic olefin phase, but less than that amount which would substantially decrease the amount of voids or voiding in the oriented article, e.g., film or sheet.

The resulting films of this invention are opaque films which exhibit a remarkable paper-like texture and appearance and are therefore suitable for use as a paper substitute, in applications such as photographic printing papers, release liners, paper-backed adhesive products, etc. The films of this invention are generally more glossy or pearlescent than typical papers.

The thermoplastic polyester continuous phase generally comprises linear homopolyesters or copolyesters, such as homopolymers and copolymers of terephthalic acid and isophthalic acid. The linear polyesters may be produced by condensing one or more dicarboxylic acids or a lower alkyl diester thereof, e.g., dimethylterephthalate, terephthalic acid, isophthalic acid, phthalic acid, 2,5-, 2,6-, or 2,7-naphthalene dicarboxylic acid, succinic acid, sebacic acid, adipic acid, azelaic acid, bibenzoic acid and hexahydroterephthalic acid, or bis-p-carboxyphenoxyethane, with one or more glycols, e.g., ethylene glycol, pentyl glycol, and 1,4-cyclohexanedimethanol. The particularly preferred polyester is polyethylene terephthalate.

Sufficient intrinsic viscosity is required in the continuous phase to yield a finished film with adequate physical properties to be useful in the desired applications, such as adhesive tapes, abrasive article substrates, and the like. Generally, the intrinsic viscosity should be greater than about 0.5 in the case of polyethylene terephthalate when measured at 30° C. using a solvent consisting of 60% phenol and 40% o-dichlorobenzene (ASTM D4603).

Polymers suitable for the discrete phase include polyolefins such as polypropylene. The preferred polyolefins are those with melt flow index (MFI), or viscosity, close to the MFI, or viscosity, of the polyester matrix (continuous phase) at the processing conditions used (for example, temperature and shear rate). Preferably, the viscosity ratio of the polyolefin to the polyester at the processing conditions is from 0.5 to 2.0. The desired morphology consists of roughly spherical polyolefin domains smaller than approximately 30 microns in diameter, preferably smaller than 15 microns in diameter. If the viscosity of the polyolefin is too high (i.e., the polyolefin MFI is too low) relative to the polyester, large polyolefin domains are formed under normal processing conditions in the extruder. Large polyolefin domains are undesirable because they give rise to large voids during film orientation which, in turn, can cause web breaks during processing. If the polyolefin viscosity is too low, relative to the polyester, adequate dispersion of the polyolefin is obtained in the extruder; however, under normal operating conditions, the low viscosity polyolefin domains tend to elongate in the flow direction near the surface of the web adjacent to the die during extrusion. Fibrillar polyolefin domains in the flow direction can cause the film to be very weak in the transverse direction, making orientation in the transverse direction difficult.

The amount of added polyolefin will affect final film properties. In general, as the amount of added polyolefin increases, the amount of voiding in the final film also increases. As a result, properties that are affected by the amount of voiding in the film, such as mechanical properties, density, light transmission, etc., will depend upon the amount of added polyolefin. As the amount of polyolefin in the blend is increased, a composition range will be reached at which the olefin can no longer be easily identified as the dispersed, or discrete, phase. Further increase in the amount of polyolefin in the blend will result in a phase inversion wherein the polyolefin becomes the continuous, phase. Preferably, the amount of the polyolefin in the composition is from 15% by weight to 45% by weight, more preferably from 20% by weight to 35% by weight, most preferably from 25% by weight to 30% by weight.

Additionally, the selected polyolefin must be incompatible with the matrix or continuous phase selected. In this context, incompatibility means that the discrete phase does not dissolve into the continuous phase in a substantial fashion, i.e., the discrete phase must form separate, identifiable domains within the matrix provided by the continuous phase.

The polyester-polyether copolymers useful as compatibilizers in this invention may change the size distribution of the discrete phase during the extrusion process. Suitable compatibilizers are those which tend to reduce the domain size of the discrete phase. The primary benefit appears to be achieved by reducing the size of the largest domains of the discrete phase. This size distribution change can be observed by comparing solid samples of different compositions. A technique which is useful in preparing samples for observation of the phases is forming or selecting a solid sample, cooling the sample in liquid nitrogen or other suitable quenching medium, and fracturing the sample. This technique should expose a fresh fracture surface which exhibits the morphology of the phases as illustrated in the attached electron micrographs.

The compatibilizer must also withstand the thermal exposure encountered during the process of extrusion of the blend, i.e., the temperature required to process the highest melting component or the blend, which will normally be the processing temperature required of the continuous phase.

Representative examples of polyester-polyether block copolymers useful in this invention include Ecdel™ 9965, 9966, and 9967 elastomeric copolymers, available from Eastman Chemical Co. and thought to be block copolymers consisting of hard and soft segments of cyclohexane-based (1,4-cyclohexanedimethanol and 1,4-cyclohexanedicarboxylic acid) with polytetramethylene oxide segments. The different grades are said to represent varying molecular weights of approximately the same ratios of hard and soft segments. Polyester-ether block copolymers based on polybutylene terephthalate and polytetramethylene oxide are also useful in this invention, as are similar polyester-ether copolymers in which another acid group, such as isophthalic acid, is substituted all or in part for the acid group of the polyester, or another glycol component is substituted all or in part for the glycol portion of either the polyester or polyether blocks. Hytrel™ thermoplastic elastomers such as G4074 and G5544, available from DuPont, both thought to be such polyester-ether block copolymers, are also suitable compatibilizer materials. Other examples of trade names of commercially available polyester-ether block copolymers are RITEFLEX™ (available from Hoechst-Celanese Corp.), PELPRENE™ (available from Toyobo Co., Ltd.) and LOMOD™ (available from General Electric Co.).

Films made using ethylene-acrylic acid copolymers as proposed compatibilizers result in brittle films. Such compatibilizers may separately form a third phase or fail to reduce the size distribution of the discrete phase. Unacceptable changes in the morphology of the blend from an unacceptable compatibilizer include the formation of a second co-continuous phase of the discrete component instead of the formation of discrete droplets.

Materials not suitable as compatibilizers may be unable to alter the size distribution of the discrete phase or may tend to make the discrete phase too miscible with the continuous phase and thereby lose the ability of the discrete phase to separate into discrete droplets. In some applications, where the goal is a finished film with lower overall density, excessive compatibility to the point of not allowing voiding to occur during orientation will also be unacceptable. Addition of amounts of the compatibilizer component must be controlled, as too much may cause the over-compatibilization of the discrete phase resulting in no voiding.

The process by which the finished articles are made may also have an effect on the finished morphology and finished physical properties. Generally speaking, a film of the invention may be made by using conventional film-making technology. This includes a means of drying, blending, and supplying resins to an extruder, a means of extruding the blended materials in a manner to properly melt and adequately mix the components, an optional means of filtering the melt, a means of casting or of forming a sheet (in the case of a flat film) or forming a tube or bubble (in the case of tubular extrusion or blown films), a means of orienting or stretching the sheet or tube (either sequentially or simultaneously), an optional means of heat setting or stabilizing the oriented film or tube (bubble), and an optional means of converting the finished film or slitting the tube or bubble.

A process of dry blending the polyolefin and compatibilizer has been found to be useful. For instance, blending may be accomplished by mixing the finely divided, e.g., powdered or granular, thermoplastic olefin discrete phase component and the compatibilizer and tumbling them together in a container. The dry blend is then fed to the extruder in a conventional manner.

Blending dry components may also be accomplished by separately feeding measured quantities of each component into an extruder hopper or throat at a rate corresponding to the ratio of the components desired in the finished article. The use of recycle materials may also be accomplished at this point. When feeding previously blended or extruded polyester, polyolefin, and compatibilizer materials, such as in a recycle feedstock, an appropriate adjustment in the feed rate of all other components is required to result in the final film containing the desired ratio of all components.

Alternatively, blending of the components may be affected by combining melt streams of the continuous component, e.g., polyester, and the other polymeric additives during the extrusion process. A common means to accomplish this is to add the minor components by extruding them as a melt stream at the desired ratio into the extruder barrel containing the major component. The ratio of the components may then be controlled by the separate rates of the separate extruders.

If filtration of the melt stream(s) is desired, this is generally accomplished by including a filtration device between the outlet or gate of the extruder and the slot or tube die. Tubular filter elements or folded fabric filter elements are commercially available and their use is common in the polymer extrusion industry.

The extrusion, quenching and stretching or orientation of the film may be effected by any process which is known in the art for producing oriented film, e.g., by a flat film process or a bubble or tubular process. The flat film process is preferred for making film according to this invention and involves extruding the blend through a slot die and rapidly quenching the extruded web upon a chilled casting drum so that the continuous phase of the film is quenched into the amorphous state. The quenched film is then biaxially oriented by stretching in mutually perpendicular directions at a temperature above the glass transition temperature of the thermoplastic polyester continuous phase. Generally, the film is stretched in one direction first and then in a second direction perpendicular to the first. However, stretching may be effected in both directions simultaneously if desired. In a typical process, the film is stretched firstly in the direction of extrusion over a set of rotating rollers or between two pairs of nip rollers and is then stretched in the direction transverse thereto by means of a tenter apparatus. Films may be stretched in each direction up to 3 to 5 times their original dimension in the direction of stretching.

The temperature of the first orientation (or stretching) affects film properties. Generally, the first orientation step is in the machine direction. Orientation temperature control may be achieved by controlling the temperature of heated rolls or by controlling the addition of radiant energy, e.g., by infrared lamps, as is known in the art of making polyethylene terephthalate films. A combination of temperature control methods may be utilized.

Too low an orientation temperature may result in a film with an uneven appearance. Increasing the first orientation temperature may reduce the uneven stretching, giving the stretched film a more uniform appearance. The first orientation temperature also affects the amount of voiding that occurs during orientation. In the temperature range in which voiding occurs, the lower the orientation temperature, generally the greater the amount of voiding that occurs during orientation. As the first orientation temperature is raised, the degree of voiding decreases to the point of elimination. Electron micrographs of samples show that at temperatures at which no voiding occurs, the polyolefin domains often deform during stretching. This is in contrast to highly voided oriented samples; electron micrographs of highly voided samples show that the polyolefin domains in general retain their approximately spherical shape during orientation.

Generally, a second orientation, or stretching, in a direction perpendicular to the first orientation is desired. The temperature of such second orientation is generally similar to or higher than the temperature of the first orientation.

After the film has been stretched it may be further processed. For example, the film may be annealed or heat-set by subjecting the film to a temperature sufficient to further crystallize the thermoplastic polyester continuous phase while restraining the film against retraction in both directions of stretching.

The film may, if desired, conveniently contain additives conventionally employed in the manufacture of thermoplastics polyester films. Thus, agents such as dyes, pigments, fillers, inorganic voiding agents, lubricants, anti-oxidants, anti-blocking agents, surface active agents, slip aids, gloss-improvers, ultraviolet light stabilizers, viscosity modifiers and dispersion stabilizers may be incorporated, as appropriate.

Films of this invention may be used without further treatment or they may be further treated, for example, by the application of a coating. This coating may provide enhanced functions such as adhesion, release, barrier, antistatic, abrasion resistance, or heat sealability, and can be applied by any conventional coating means. A further method of producing a coated film is to apply the coating to the film at some stage before orientation, or preferably, in the case of biaxially oriented film, between the two stages of biaxial orientation of the film. Suitable coatings which may be applied in this way include, for example, coatings of vinylidene chloride copolymers, for example, vinylidene chloride/acrylonitrile copolymers containing from 4 to 20% of acrylonitrile.

The films may be used in any of the applications for which polyethylene terephthalate is used except, of course, those where a high degree of transparency is required. For example, the film may be used as a paper substitute, as a base for carbon paper and carbon ribbon for use in typewriters, in applications in which very high speed printing machines are used in conjunction with computers, textile threads where the decorative appearance of the films is useful, magnetic recording tape, cable wrapping and as a thermal barrier, for example, in protective clothing. The films of this invention may be part of multi-layer compositions comprising layers of non-voided films or other materials.

The films of this invention exhibit a remarkable paper-like texture and appearance and are therefore suitable for use as a paper substitute, in applications such as photographic printing papers, release liners, paper-backed adhesive products, etc. The films of this invention are generally more glossy or pearlescent than typical papers.

EXAMPLES

In the following Examples and Comparative Examples a variety of extrudable compositions were prepared with a polyester continuous phase and a polypropylene discrete phase. Some of these compositions were extruded into film.

Example 1

An additive blend of materials was made by dry blending 30 parts (30% by wt) FINA 3374X polypropylene (available from Fina Oil and Chemical Co.) having a melt flow index (mfi) of 2.5 (determined by ASTM D1238-90b) and a compatibilizer consisting of 0.25 parts (0.25% by wt.) of pre-dried HYTREL™ G4074 engineering thermoplastic elastomer (available from E. I. DuPont deNemours & Co., Inc.). This blend was then fed to the input of a 2.5 inch (6.35 cm) extruder using a volumetric solids feeder to control the rate of addition. An additional feed stream of 69.75 parts (69.75% by wt.) dried, extrusion grade polyethylene terephthalate (PET), with an intrinsic viscosity (I.V.) of 0.58 to 0.64 and a melt point of about 253° C. (determined as the maximum in the melting peak of the 2nd heating scan taken @ 20° C./Min. using a Perkin-Elmer DSC7), was fed to the input of the extruder. The total feed rate was about 100 lbs/hr. The extruder had a 24:1 L/D barrel and was equipped with a mixing screw to provide enhanced mixing of the components. A filter for particulate control and a gear pump for flow rate control were installed between the extruder gate and a 14.5 inch (36.8 cm) wide sheeting die with a die gap of about 0.040 inches (0.10 cm). The extruder temperatures were approximately: zone 1 455° F. (235° C.), zone 2 499° F. (259° C.), zone 3 500° F. (260° C.), zone 4 510° F. (266° C.), gate 510° F. (266° C.), filter, gear pump and necktube 530° F. (277° C.), and die 525° F. (274° C.). A static mixer was used in the necktube, close to the die, in order to minimize thermal gradients in the melt. The sheet formed by the die was cast onto a temperature controlled casting wheel maintained at a temperature of about 110° F. (43° C.) and the cast sheet was held in place by electrostatic pinning. A finished film was then made using conventional polyester film biaxial orientation equipment to stretch the film in the machine direction (MD) about 3.4 times by preheating the cast web to about 200° F. (93° C.) and then stretching at a temperature of about 225° F. (107° C.) and then to stretch the film in the transverse direction (TD) about 3.0 times at a temperature of about 245° F. (118° C.). The stretched film was then subjected to a heat set temperature of about 420° F. (216° C.) for about 20 sec. while the film was restrained.

Examples 2–6

In Example 2, film was made as in Example 1 except the compatibilizer and PET percentages were varied as shown in Table 1. In Examples 3–6, films were made as in Example 1 except the compatibilizer and PET percentages were varied as shown in Table 1 and the MD stretch temperature was about 240° F. (116° C.). The polypropylene percentage remained at 30 wt %. Because the thickness of the finished film will vary with changes in compatibilizer level, changes in casting wheel speed were made to keep the finished film thickness within the range of about 3.5 to 4.5 mils (0.089 to 0.11 mm) where necessary. The finished film thickness was measured using a contact micrometer with a foot size of about 1.25 cm in diameter to allow a reading to be taken without "denting" the film as would result from a stylus-type foot. The compositions and densities of the resulting films are summarized in Table 1.

Comparative Example C1

In Comparative Example C1, film was made as in Example 1 except no HYTREL™ G4074 thermoplastic elastomer was added as a compatibilizer. The polypropylene percentage remained at 30 wt %. The resulting film density and composition are also included in Table 1.

The film density was calculated by using a calculated sample weight per sample volume as follows. Five disks 1.971 inches (5 cm) in diameter were stamped out using a circular die and the sample density was calculated as follows:

$$\text{Density(g/cc)} = \frac{\text{Weight of the 5 disks (grams)} \times 4}{\text{Ave. caliper of the 5 disks(mils)}}$$

The 4 is a conversion factor used to convert the sample volume into cubic centimeters.

TABLE 1

| Ex. | PET, Wt % | Compatibilizer, Wt % | Density, g/cc |
|---|---|---|---|
| C1 | 70 | 0 | 0.58 |
| 1 | 69.75 | 0.25 | 0.78 |
| 2 | 69.5 | 0.5 | 1.01 |
| 3 | 69 | 1 | 1.05 |
| 4 | 68 | 2 | 1.07 |
| 5 | 65 | 5 | 1.08 |
| 6 | 60 | 10 | 1.04 |

The data in Table 1 show that low density films can be made at low levels of compatibilizer addition.

Comparative Example C2 and Examples 7 and 8

Comparative Example C2 and Examples 7 and 8, films were made as in Comparative Example C1, and Examples 1, and 2 respectively except FINA 3230 polypropylene (mfi of 1.6) was used instead of FINA 3374X polypropylene (mfi of 2.5) and the MD preheat temperatures were about 205° F. (95° C.). TD stretch temperatures were varied in a range of 250° F. (121° C.) to 315° F. (157° C.) in an attempt to locate an appropriate temperature at which to TD orient Comparative Example C2. A suitable temperature was not found and numerous web breaks resulted. When 0.25 lbs/hr of Hytrel™ G4074 thermoplastic elastomer was added to the extruder to produce Example 7, the TD stretch temperature was lowered to about 275° F. (135° C.) and the frequency of web breaks was substantially reduced. Example 8 was also produced at a TD stretch temperature of about 275° F. (135° C.) without web breaks. In each case, the heatset temperature was about 420° F. (216° C.).

FIG. 1 is an SEM micrograph of the unoriented cast web sample of the composition described in Comparative Example C2 (without compatibilizer). FIG. 1 shows the approximate center of the cast web cross-section. The machine direction is shown by the arrows in the micrograph. Note the numerous larger (about 15–20 microns) polypropylene domains seen in the micrograph.

FIG. 2 is an SEM micrograph of the unoriented cast web sample of the composition described in Example 8. FIG. 2 shows the approximate center of the cast web cross-section. The machine direction is shown by the arrows in the micrograph. Note the absence of the larger (about 15–20 microns) polypropylene domains in the compatibilized sample of FIG. 2 when compared to the uncompatibilized sample in FIG. 1.

FIG. 3 is an SEM micrograph of the machine direction oriented (MDO) web sample of the composition described in Example 8. FIG. 3 shows the approximate center of the MDO web cross-section. The machine direction is shown by the arrows in the micrograph. The voids that form around the polypropylene domains as a result of stretching the film are easily seen in FIG. 3.

In Examples 9–11, films were produced as in Example 8 except the MD stretch temperature was about 240° F. (116° C.). The compositions and results of density testing are summarized in Table 2.

TABLE 2

| Ex. | PET, Wt % | Compatibilizer, Wt % | Density, g/cc | Thickness, mils |
|---|---|---|---|---|
| C2 | 70 | 0 | 0.60 | 4.0 |
| 7 | 69.25 | 0.25 | 0.69 | 4.3 |
| 8 | 69.5 | 0.5 | 0.80 | 3.7 |
| 9 | 69.0 | 1.0 | 0.95 | 3.0 |
| 10 | 68.0 | 2.0 | 1.01 | 2.7 |
| 11 | 65.0 | 5.0 | 1.08 | 3.6 |

During the processing of Comparative Example C2, numerous web breaks and processing problems were encountered. The larger polypropylene domains observed in Comparative Example C2 (see FIG. 1) may cause large voids to be generated during stretching. These large voids may be the source of the processing problems and web breaks resulting from large voids generated during stretching. Examples 7–11 were produced with substantially fewer web breaks. The data in Table 2 show that low levels of compatibilizer produce acceptable, low density films.

The films from the above Examples and Comparative Examples were tested for the following physical properties.

Light transmission values were obtained using a Gardner Hazemeter Model UX10 in accordance with ASTM D1003.

Heat shrinkage data in (MD) were obtained by cutting a sample strip 1 inch wide, about 12 inches long, placing marks on the sample strip 10 inches apart, fastening one end of the sample strip to a rack designed to hold multiple sample strips, inserting the rack with the sample strip(s) into a convection oven set at 150° C., heating the sample to 150° C. for 15 minutes, cooling the sample to room temperature and measuring the change in length between the 10 inch marks. This change was reported as a percent shrinkage. The designation "left/center/right" refers to the location in the film from which the test sample was cut.

Physical properties such as modulus, break strength, and break elongation were determined by ASTM D882 with 1 inch sample width, 4 inch jaw gap, 2 inch/min jaw speed on a Model 4502 Instron™ tensile tester. A sample for MD testing was cut parallel to the MD direction.

Roughness was obtained by testing on a Rodenstock Model RM 600, which utilizes a non-contacting, dynamically focused laser beam. Vapor coated samples were tested using the following conditions, a range of 30 microns, a table speed of 10 mm/min, 8000 points, a scan length of 5 mm, a low frequency cutoff of 0.10 and a high frequency cutoff of 10.0. The two $R_q$ values (defined as the geometric average from the test center line) were obtained by testing both sides of the samples.

The test results are summarized in Table 3.

about 3.28 times by preheating the cast web to about 200° F. (121° C.). The film was then stretched in the TD direction as in C1. The resulting film had a mottled, nonuniform appearance and a density of 1.01 g/cc. The resulting web exhibited substantial fibrillation of the polypropylene domains at the die surface as shown in FIG. 4. FIG. 4 is an SEM micrograph of the MDO web cross-section from a sample collected during processing. An MDO web surface adjacent to the die during extrusion is visible in the top portion of the micrograph; the machine direction is shown by the arrows in the micrograph. It can be seen in FIG. 4 that to a depth of about 75 microns from the die surface, the polypropylene domains were deformed into fibers which are aligned in the machine direction. This excessive fibrillation of the polypropylene domains at the web surface was not seen in examples utilizing either the 2.5 mfi or 1.6 mfi polypropylenes under similar processing conditions, as shown in FIG. 5 for the 1.6 mfi polypropylene. FIG. 5 is an

TABLE 3

| Ex. | Density, g/cc | Light Transmission, % | MD Shrinkage Left/Center/Right, % | Modulus MD × TD, ksi | Break Strength MD × TD, ksi | Break Elongation MD × TD, % | Roughness $R_q$, microns |
|---|---|---|---|---|---|---|---|
| C1 | 0.58 | 18.3 | 1.3/1.2/1.3 | 208 × 183 | 6.29 × 4.93 | 28.6 × 12.8 | 1.03 × 0.859 |
| 1 | 0.78 | 22.9 | 1.4/1.4/1.5 | 283 × 262 | 9.86 × 8.42 | 39.3 × 23.9 | 0.982 × 0.792 |
| 2 | 1.01 | 44.6 | 1.2/1.0/1.1 | 335 × 367 | 9.30 × 11.3 | 28.6 × 33.8 | 0.997 × 0.774 |
| 3 | 1.05 | 51.9 | 1.1/1.0/1.2 | 326 × 378 | 7.77 × 10.2 | 14.4 × 26.7 | 0.832 × 0.765 |
| 4 | 1.07 | 63.3 | 1.2/1.0/1.1 | 297 × 366 | 6.32 × 9.21 | 5.6 × 17.2 | 0.933 × 1.070 |
| 5 | 1.08 | 75.1 | 1.2/1.0/1.2 | 286 × 351 | 6.01 × 9.08 | 5.5 × 19.6 | 0.764 × 0.909 |
| 6 | 1.04 | 69.9 | 1.1/1.0/1.1 | 255 × 310 | 5.10 × 7.48 | 3.9 × 10.3 | 0.997 × 0.897 |
| C2 | 0.60 | 17.8 | 1.5/1.3/1.2 | 230 × 228 | 7.16 × 6.93 | 28.5 × 15.2 | 0.598 × 0.452 |
| 7 | 0.69 | 9.7 | 1.4/1.2/1.3 | 224 × 213 | 8.08 × 6.78 | 35.4 × 18.6 | 0.842 × 0.768 |
| 8 | 0.80 | 12.8 | 1.5/1.3/1.3 | 252 × 244 | 8.65 × 7.74 | 33.2 × 19.7 | 0.942 × 0.975 |
| 9 | 0.95 | 24.7 | 13./1.2/1.3 | 312 × 328 | 9.06 × 9.97 | 31.0 × 26.6 | 0.942 × 0.633 |
| 10 | 1.01 | 40.2 | 1.3/1.0/1.2 | 307 × 357 | 7.61 × 10.44 | 20.3 × 26.6 | 0.773 × 0.641 |
| 11 | 1.08 | 47.8 | 1.3/1.1/1.2 | 288 × 379 | 6.36 × 10.57 | 23.4 × 28.7 | 0.801 × 0.626 |

The data in Table 3 show that as the wt % Hytrel™ G4074 thermoplastic elastomer compatibilizer was increased, the density of the finished film also increased. This appears to indicate that the amount of voiding in the film decreased with increasing wt % compatibilizer. This appears to be confirmed with SEM micrographs as well as light transmission measurements. Light transmission increases as voiding decreases, probably because there are fewer or smaller voids around the polypropylene domains to scatter light. The above light transmission data has not been normalized for film thickness, however. The increase of Hytrel™ G4074 thermoplastic elastomer compatibilizer concentration appears to reduce the size of the largest polypropylene domains, thus affording some control on some finished film properties as well as domain size. However, excessive Hytrel™ G4074 thermoplastic elastomer concentration appears to inhibit voiding during film orientation.

Even though Comparative Examples C1 and C2 appear to have similar physical properties compared to the examples of the invention, large polypropylene domains are seen in these uncompatibilized Comparative Examples. When this film is oriented, large voids appear to form around these domains resulting in frequent web breaks during processing which is unacceptable.

Comparative Example C3

In Comparative Example C3, film was made as in Comparative Example C1 except that Exxon 1024 polypropylene (12 mfi) was used, and the film was stretched in the MD SEM micrograph of an unoriented cast web sample of the composition described in comparative Example C2.

Examples 12–15

In Examples 12–15, additive blends were made as described in Example 1 except 30 parts Fina 3230 polypropylene was used instead of 30 parts Fina 3374X polypropylene. The Hytrel™ thermoplastic elastomer compatibilizer and PET percentages were varied as shown in Table 4. In these examples, the Fina 3230 polypropylene and Hytrel™ G4074 thermoplastic elastomer were dry blended in a drum tumbler for at least 45 minutes and the blend was fed to the input of a 4.5 inch (11.43 cm) extruder using a volumetric solids feeder to control the rate of addition. Predried PET was also fed to the input of the extruder for a total feedrate of approximately 400 lbs/hr. The extruder had a 31/1 L/D barrel equipped with a high output screw which fed an 18-inch (45.72 cm) wide sheeting die with a die gap of about 0.065 inches (0.165 cm). The extruder temperature zones were set to approximately: zone 1 480° F. (249° C.), zone 2 490° F. (254° C.), zone 3 500° F. (260° C.), zone 4,5 and 6 520° F. (271° C.), gate, filter, gear pump and necktube 515° F. (268° C.) and die 535° F. (279° C.). A static mixer was used in the necktube, close to the die, in order to minimize thermal gradients in the melt. These conditions produced a melt temperature at the gate of about 545° F. (285° C.). The sheet formed by the die was cast onto a temperature controlled casting wheel maintained at about 90° F. (32° C.). The cast sheet was held in place by electrostatic pinning. A film was then made by stretching the cast sheet using conventional polyester film biaxial orientation equipment. The cast sheet was stretched in the machine direction (MD) about 3.2 times by preheating the cast sheet to about 180° F. (82° C.) and then stretching the sheet at a temperature of about 190° F. (88° C.). The MDO film was then stretched in the transverse direction (TD) 3.0–3.2 times in a conventional tentering machine. The TD stretch temperature for Examples 12 and 13 was about 230° F. (110° C.), for Example 14 about 250° F. (121° C.) and Example 15 about 260° F. (127° C.). The biaxially stretched films were then subjected to a heat set or annealing temperature of about 450° F. (232° C.) for 10–15 sec. while the film was restrained. The densities of the resulting films are summarized in Table 4. FIG. 6 is an SEM micrograph of the unoriented cast web sample described in Example 14. FIG. 6 shows the approximate center of the cast web cross-section. The machine direction is shown by the arrows in the micrograph. Note the absence of the larger (about 15–20 microns) polypropylene domains that were seen in FIG. 1 (Comparative Example C2).

Comparative Example C4

In Comparative Example C4, film was made as in Example 12 except that no Hytrel™ G4074 thermoplastic elastomer was added, and the TD stretch temperature was about 210° F. (99° C.). The polypropylene percentage remained at 30 wt %. The resulting film density and composition is also included in Table 4.

TABLE 4

| Example | PET, Wt % | Hytrel ™ G4074, Wt % | Density, g/cc |
|---|---|---|---|
| C4 | 70.00 | 0.00 | 0.75 |
| 12 | 69.98 | 0.02 | 0.76 |
| 13 | 69.96 | 0.04 | 0.89 |
| 14 | 69.94 | 0.06 | 0.92 |
| 15 | 69.90 | 0.10 | 0.96 |

The data in Table 4 show that low density film can be made at very low levels of compatibilizer addition. The films were evaluated for physical properties similar to that listed in Table 3 for Examples 1–11. For Examples 12–15, samples with similar film densities to those of Examples 1–11 had similar results for the other properties tested. Values for sample roughness, $R_q$, varied from 1.20 to 1.53 microns.

Examples 16, 17, 18

In Examples 16, 17, 18, films were made as in Example 1 except the thickness and MD stretch temperature were varied as shown in Table 5.

TABLE 5

| Ex. | MD Stretch Temperature, °F. | Density, g/cc | Finished Thickness, mils |
|---|---|---|---|
| 16 | 210 (99° C.) | 0.86 | 4.20 |
| 17 | 210 (99° C.) | 0.98 | 1.90 |
| 18 | 255 (124° C.) | 1.06 | 3.78 |

The data in Table 5 show that MD stretch temperature is another way of controlling finished film density. The density of Example 17 may be higher than Example 16 because of its overall lower thickness. As the thickness of a film is reduced, the higher density of the surface layers has a larger effect on average density. This higher density may be because of minimal voiding at or near the surface of the web.

Comparative Examples C5–C9

In Comparative Example C5, film was made as in Comparative Example C1 except the MD stretch temperature was about 210° F. (99° C.). Comparative Example C5 had a thickness of about 5.4 mils (127 micrometers) and a density of 0.72 g/cc. This film is undesirable because of the propensity for web breaks during processing similar to C1 and C2.

In Comparative Example C6, film was made as in Example 2 except 0.5 wt. % Primacor™ 3330R adhesive polymer, said to be an ethylene-acrylic acid copolymer, (available from Dow Chemical Co.) was added and the MD stretch temperature was about 240° F. (116° C.) with a preheat of about 200° F. (93° C.). In Comparative Example C7, film was made as in Comparative Example C6 except 1.0 wt. % Primacor™ 2912R adhesive polymer, said to be an ethylene-acrylic acid copolymer, was added. In Comparative Example C8, film was made as in Comparative Example C6 except Polybond™ 3002 functionalized olefin said to be a maleic anhydride-modified polypropylene with an unknown percent functionality, (available from BP Performance Polymers, Inc.) was used instead of Primacor™ 3330R adhesive polymer. In Comparative example C9, film was made as in Comparative Example C8 except 2.0 wt. % Polybond™ 3002 modified polypropylene was used. Comparative Examples C6–C9 showed no obvious change or reduction in polypropylene domain size compared to Comparative Example C5 which contained no compatibilizer. However, C6 and C7 appeared to show the presence of a third phase at the polypropylene interface.

The films were then evaluated as described above. The test results are summarized in Table 6.

TABLE 6

| Ex. | Density, g/cc | Light Transmission, % | MD Shrinkage Left/Center/Right, % | Modulus MD x TD, ksi | Break Strength MD x TD, ksi | Break Elongation MD x TD, % | Roughness $R_q$, microns |
|---|---|---|---|---|---|---|---|
| C5 | 0.72 | 12.5 | 1.7/1.7/1.7 | 246 x 199 | 9.1 x 6.2 | 39.1 x 17.8 | 0.64 x 0.76 |
| C6 | 0.94 | 43.2 | 1.3/1.0/1.2 | 216 x 247 | 3.72 x 4.22 | 3.1 x 2.2 | 2.30 x 2.45 |
| C7 | 1.03 | 57.0 | 1.3/1.0/1.3 | 242 x 253 | 4.17 x 4.14 | 2.9 x 2.1 | 2.63 x 2.68 |
| C8 | 0.89 | 41.7 | 1.4/1.0/1.2 | 209 x 236 | 3.46 x 3.84 | 3.4 x 2.1 | 2.79 x 2.82 |
| C9 | 1.01 | 49.7 | 1.2/1.0/1.1 | 259 x 256 | 4.64 x 4.29 | 3.0 x 2.0 | 2.60 x 2.70 |

Example 19

In Example 19, a sample was prepared in a 60 ml mixing bowl (available from C.W. Brabender, Type: R.E.E. 6-230V 8.5 amp No: A.A. 526 S.B.) with heating means and mixing means operated at 50 revolutions per minute (RPM) and about 275° C. The following materials were weighed and added to the mixing bowl all at once: a) 39.0 grams polyethylene terephthalate (PET) as used in Example 1 which had been dried overnight at 130° C., b) 18.0 grams FINA 3374X polypropylene and c) 3.0 grams Ecdel™ 9966 elastomer, said to be a copolyester ether, (available from Eastman Chemical Co.). The mixture was blended for 5 minutes at 50 RPM and at about 275° C. The mixing bowl with the heated mixture was then removed from the mixer and the mixture was quickly scraped from the bowl and placed directly into a water bath at about 50° F. (10° C.) to quench the blend. A batch of only polypropylene was run after each mixture to clean the mixing bowl. A sample of the cooled blend was fractured by placing the sample in liquid nitrogen and breaking with a hammer at liquid nitrogen temperatures. A representative piece showing the fractured surface was mounted on a standard Cambridge SEM stub and sputter coated with Au/Pd before examination. The electron micrograph shown as FIG. 7 was generated using a Hitachi S-530 SEM operated at 20 KV and a working distance of 25mm. The electron micrograph was taken at 1000× and shows a distribution of polypropylene domain sizes ranging from less than 1 micron to approximately 10 microns.

Comparative Example C10

In Comparative Example C10, a blend was made as in Example 19 except no Ecdel™ 9966 elastomer was used as a compatibilizer and 18.0 grams of the polypropylene and 42.0 grams of PET were used. The resulting electron micrograph, taken at 1000× (FIG. 8), shows a distribution of polypropylene domain sizes ranging from less than 1 micron to approximately 20 microns.

Examples 20–28

In Examples 20–28, blends were made as in Example 19 except the compatibilizer used was as listed in Table 7. The Ecdel™ elastomer materials were available from Eastman Chemical Co. and differed in mfi according to Eastman Chemical Co. literature. The 9965 grade was reported to have a mfi measured in grams/10 min. at 230° C. of 15, grade 9966 mfi was reported as 10 and grade 9967 mfi was reported as 4. The Riteflex thermoplastic polyester elastomers were obtained from Hoechst-Celanese Corp., and the Hytrel™ materials were available from E. I. DuPont deNemours & Co., Inc.

TABLE 7

| Ex. | Compatibilizer | Size Range of PP diam., micrometers | Electron Micrograph FIG. # |
|---|---|---|---|
| 19 | Ecdel ™ 9966 elastomer | <1–10 | 7 |
| 20 | Ecdel ™ 9967 elastomer | <1–10 | |
| 21 | Ecdel ™ 9965 elastomer | <1–9 | |
| 22 | Riteflex ™ 672 elastomer | <1–6 | 9 |
| 23 | Riteflex ™ 655 elastomer | <1–11 | |
| 24 | Hytrel ™ 7246 elastomer | <1–3.5 | |
| 25 | Hytrel ™ G5544 elastomer | <1–14 | |
| 26 | Hytrel ™ 6356 elastomer | <1–7 | |
| 27 | Hytrel ™ 8238 elastomer | <1–6 | 10 |
| 28 | Hytrel ™ G4074 elastomer | <1–10 | 11 |
| C10 | no compatibilizer | <1–20 | 8 |

Comparative Example C11

In Comparative Example C11 a blend was made as in Example 19 except 39 grams polyethylene terephthalate (PET), which had been dried overnight at 130° C., 18 grams of PRO-FA™ 6723, a 0.8 mfi polypropylene, available from Himont, Inc., and 3.0 grams Kraton™ FG 1901X (said to be a maleic anhydride modified styrene-ethylene/butylene-styrene triblock copolymer, available from Shell Chemical Co.), were used as the ingredients. The size of polypropylene domains in FIG. 12 were determined to be between less than 1 and 8 microns. FIG. 12 indicates a fracturing of the polypropylene domains rather than a separation at the domain interface. This may indicate an increased adhesion at the domain interface. If the interfacial adhesion becomes too strong voids may not form during subsequent stretching and the desired density reduction due to voiding will not be present.

Comparative Example C12

In Comparative Example C12, a blend was made as in Comparative Example C11 except Kraton™ 1652 (said to be a styrene-ethylene/butylene-styrene triblock copolymer with a styrene/rubber ratio of 29/71) was used instead of Kraton™ FG1901X copolymer. The resulting morphology shown in FIG. 13 appears to indicate a co-continuous morphology and thus, it would be a poor compatibilizer for the PET and PP polymer blend as the desired domain shape and size distribution were not realized. In this context, co-continuous means there is no distinct continuous or discrete phase.

Micrographs 15 FIG. 1 is an SEM micrograph of the unoriented cast web of the composition described in Comparative Example C2 (30 wt % Fina 3230 polypropylene/70 wt % PET).

The micrograph is of the approximate center of the sample cross-section. The machine direction is shown by the arrows. The magnification is 1000×.

FIG. 2 is an SEM micrograph of the unoriented cast web of the composition described in Example 8 (30 wt % Fina 3230 polypropylene/69.5 wt % PET/0.5 wt % Hytrel™ G4074). The micrograph is of the approximate center of the sample cross-section. The machine direction is shown by the arrows. The magnification is 1000×.

FIG. 3 is an SEM micrograph of the MDO web of the composition described in Example 8 (30 wt % Fina 3230 polypropylene/69.5 wt % PET/0.5 wt % Hytrel™ G4074). The micrograph is of the approximate center of the sample cross-section. The machine direction is shown by the arrow. The magnification is 1000×.

The results shown in Table 6 for Comparative Examples C6–C9 were unacceptable because the films were excessively brittle as shown by the low elongation values. Comparative Example C5 was unacceptable because it was prone to web breaks.

FIG. 4 is an SEM micrograph of the MDO web of the composition described in Comparative Example C3 (30wt % Exxon 1024 polypropylene/70 wt % PET). The micrograph is of the MDO web cross-section with a web surface ("sample surface") adjacent the die during extrusion visible in the top portion of the micrograph. The machine direction is shown by the arrow. The magnification is 500×.

FIG. 5 is an SEM micrograph of the unoriented cast web of the composition described in Comparative Example C2 (30 wt % Fina 3230 polypropylene/70 wt % PET). The micrograph is of the cast web cross-section with a web surface ("sample surface") adjacent the die during extrusion visible in the top portion of the micrograph. The machine direction is shown by the arrow. The magnification is 500×.

FIG. 6 is an SEM micrograph of the unoriented cast web of the composition described in Example 14 (30 wt % Fina 3230 polypropylene/69.94 wt % PET/0.06 wt % Hytrel G4074 copolymer). The micrograph is of the approximate center of the sample cross-section. The machine direction is shown by the arrow. The magnification is 1000×.

Figure 1:
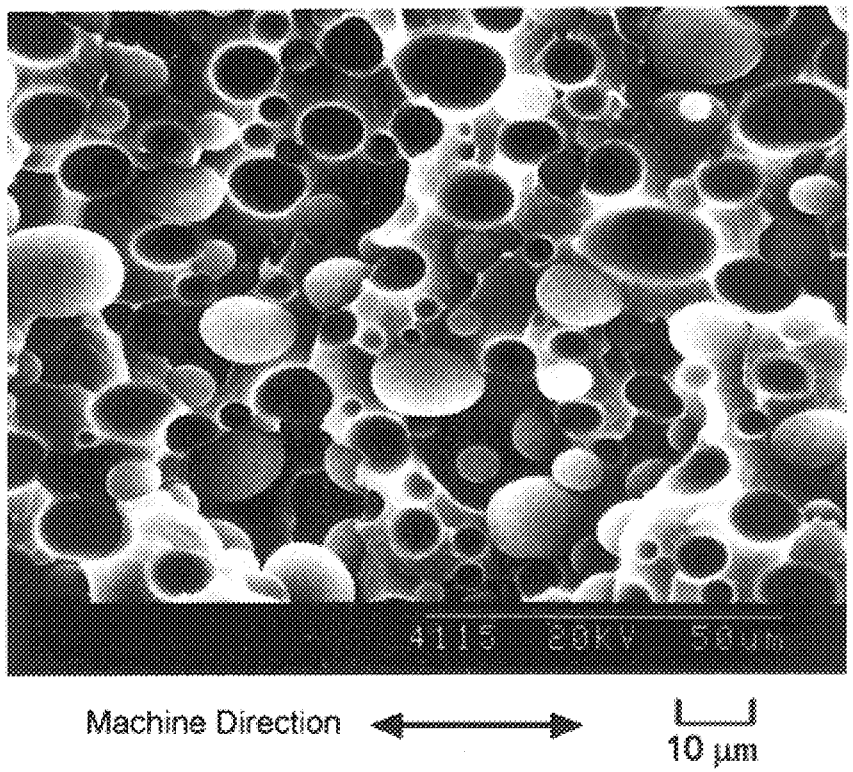
Figure 2:
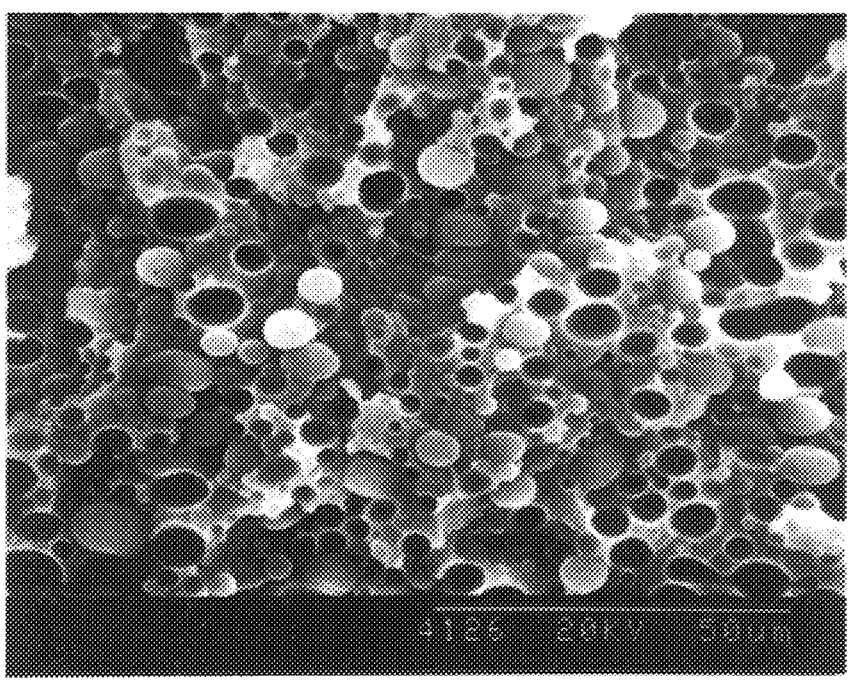
Figure 3:
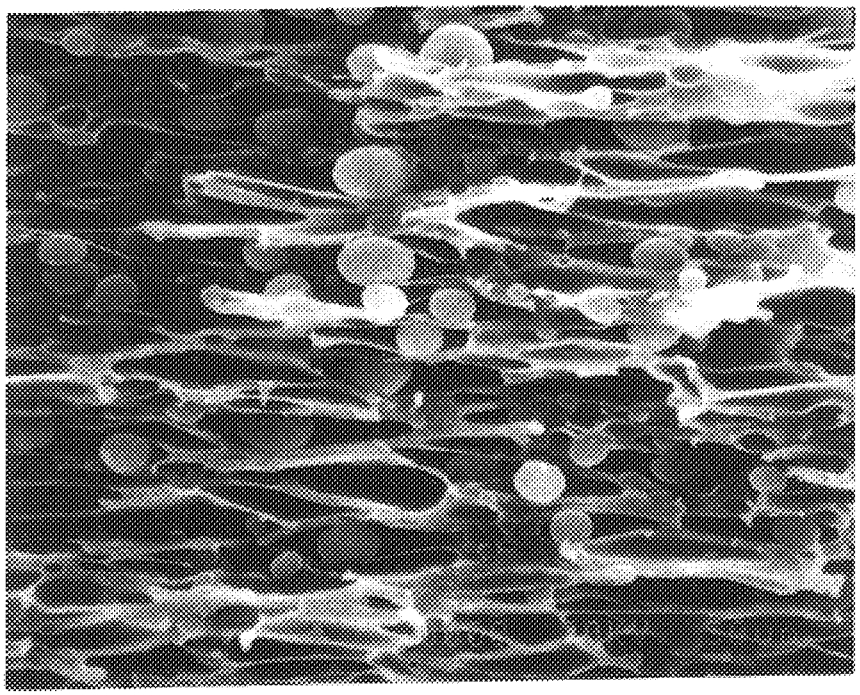
Figure 4:
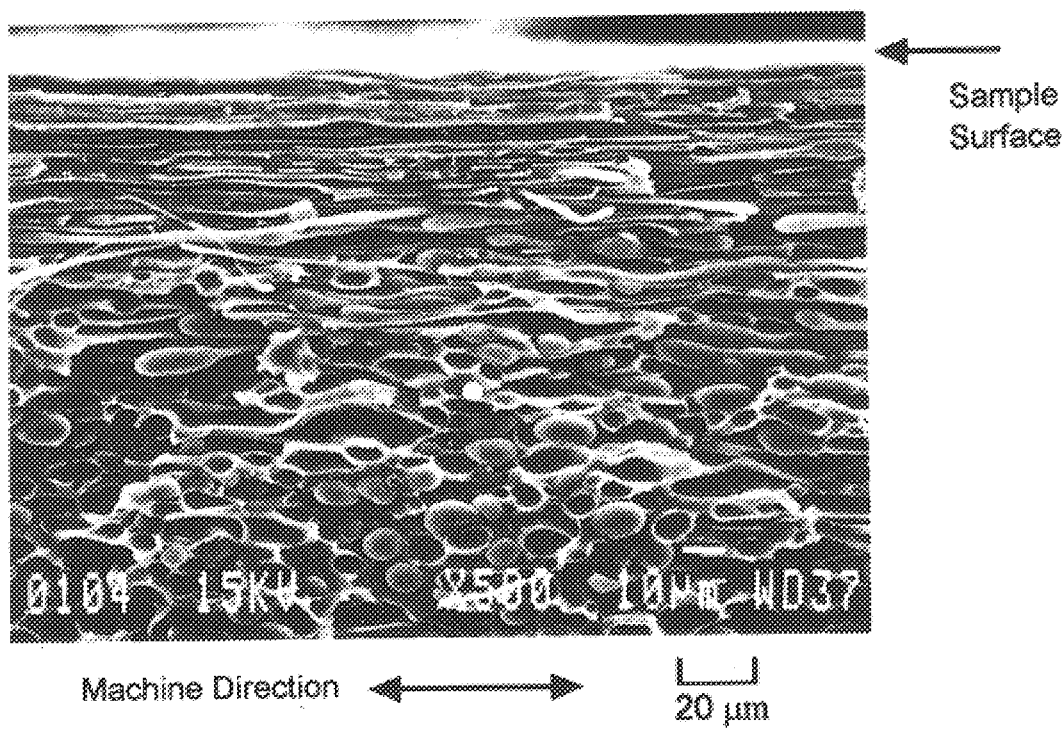
Figure 5:
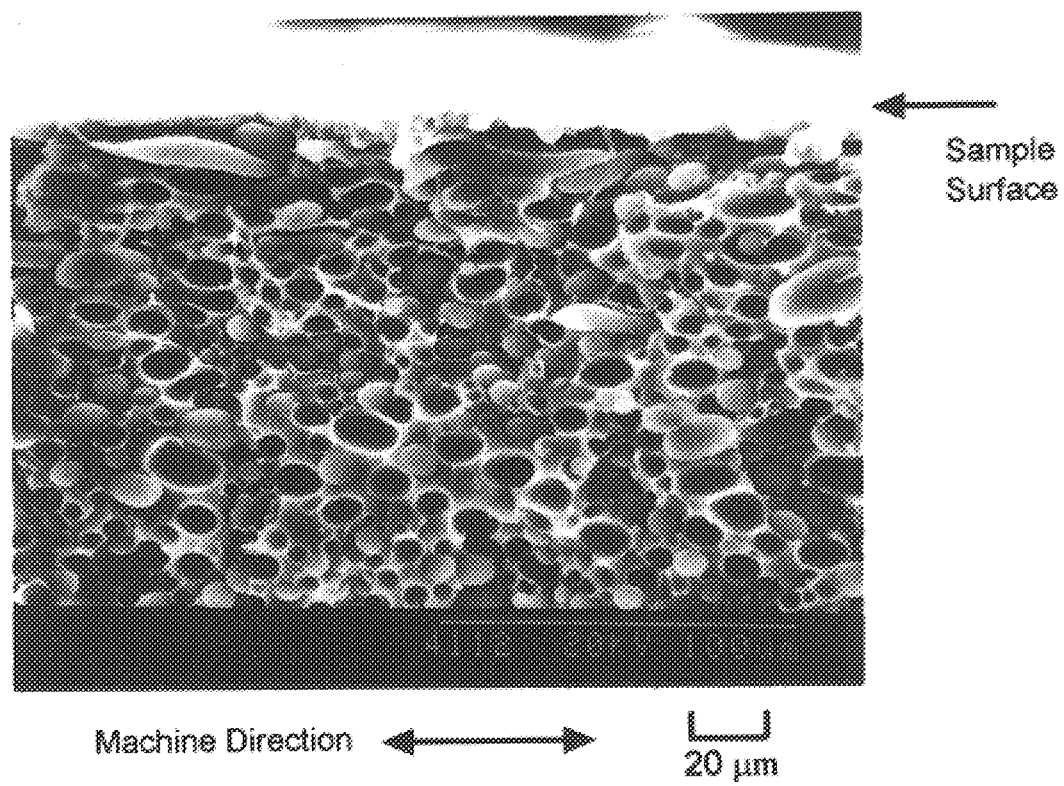
Figure 6:
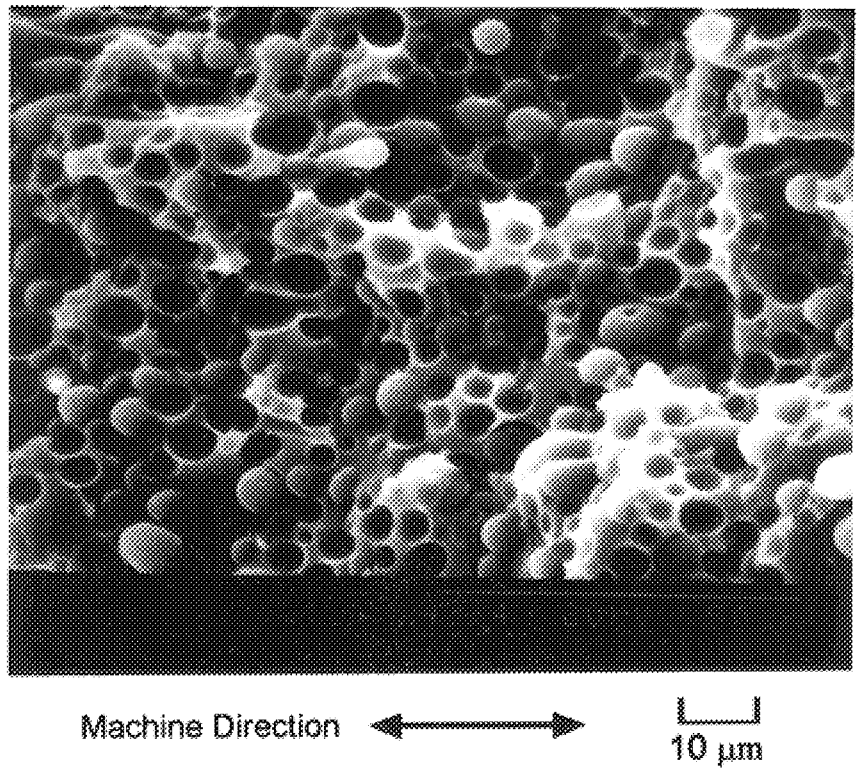
Figure 7:
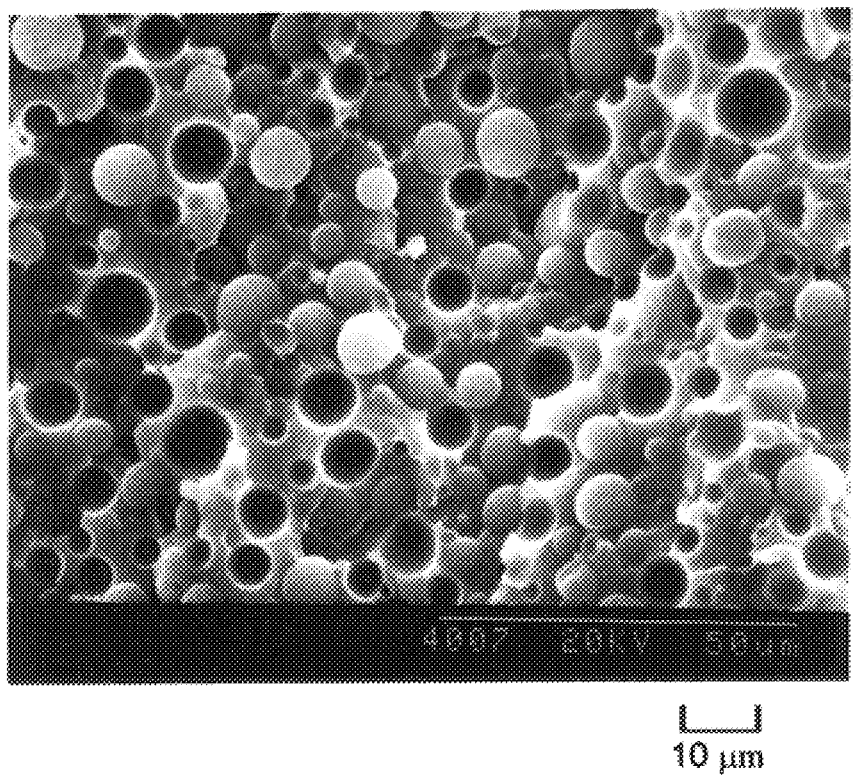
FIG. 7 is an SEM micrograph of the mixing bowl sample of the composition described in Example 19 (30 wt % Fina 3374X polypropylene/65 wt % PET/5 wt % Ecdel 9966). The magnification is 1000×.
Figure 8:
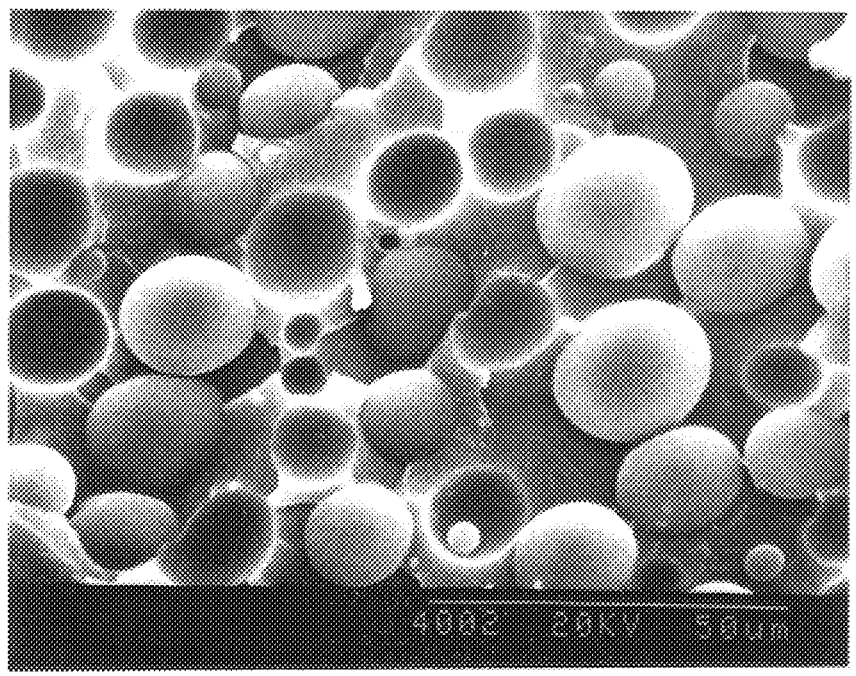
FIG. 8 is an SEM micrograph of the mixing bowl sample of the composition described in Comparative Example C10 (30 wt % Fina 3374X polypropylene/70 wt % PET). The magnification is 1000×.
Figure 9:
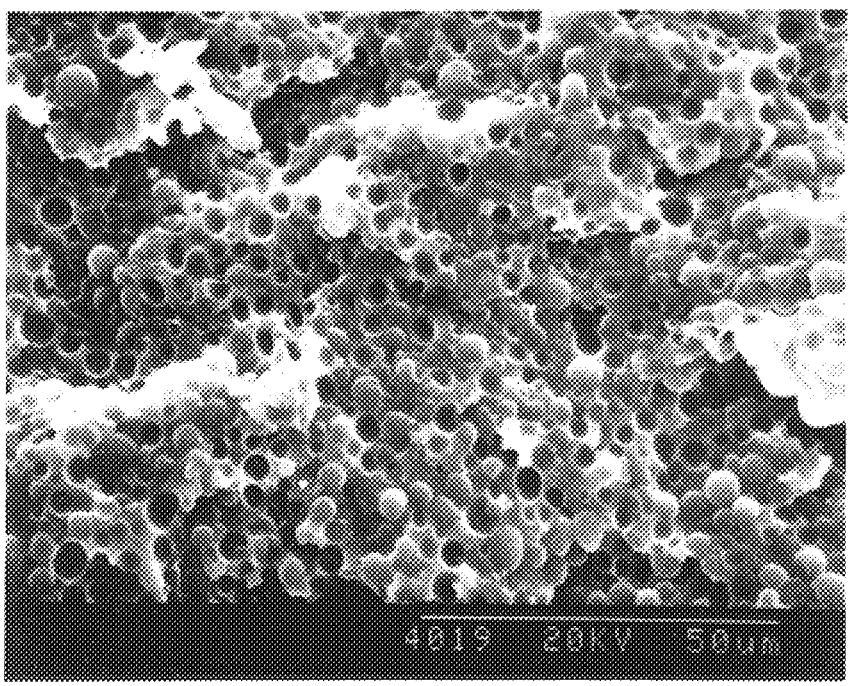
FIG. 9 is an SEM micrograph of the mixing bowl sample of the composition described in Example 22 (30 wt % Fina 3374X polypropylene/65 wt % PET/5 wt % Riteflex 672). The magnification is 1000×.
Figure 10:
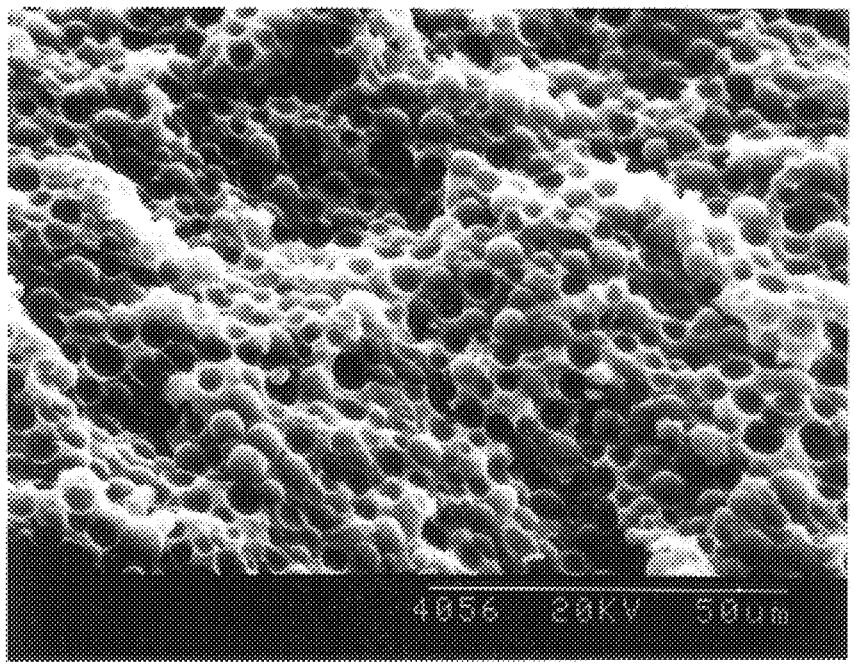
FIG. 10 is an SEM micrograph of the mixing bowl sample of the composition described in Example 27 (30 wt % Fina 3374X polypropylene/65 wt % PET/5 wt % Hytrel 8238). The magnification is 1000×.
Figure 11:
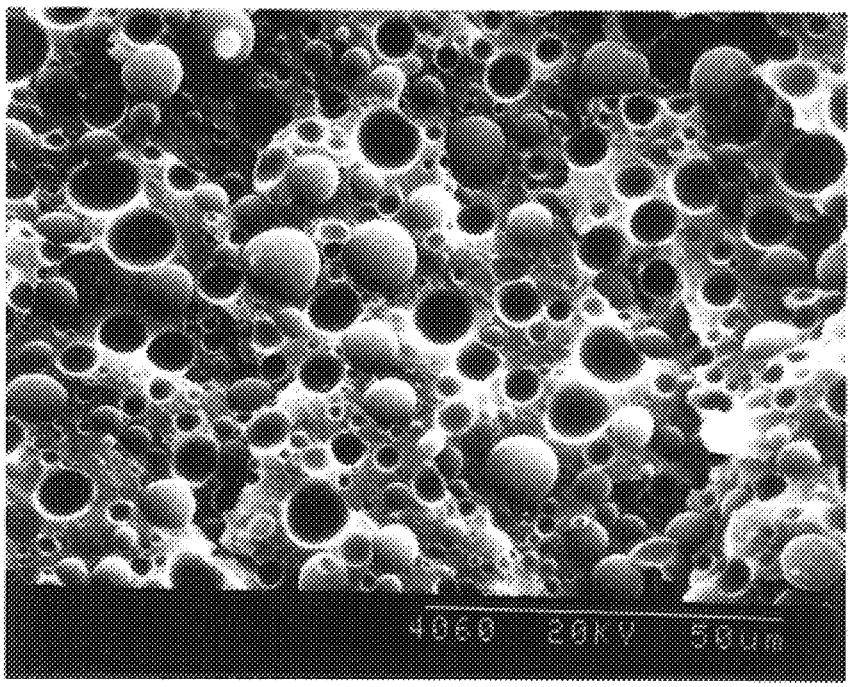
FIG. 11 is an SEM micrograph of the mixing bowl sample of the composition described in Example 28 (30 wt % Fina 3374X polypropylene/65 wt % PET/5 wt % Hytrel G4074). The magnification is 1000×.
Figure 12:
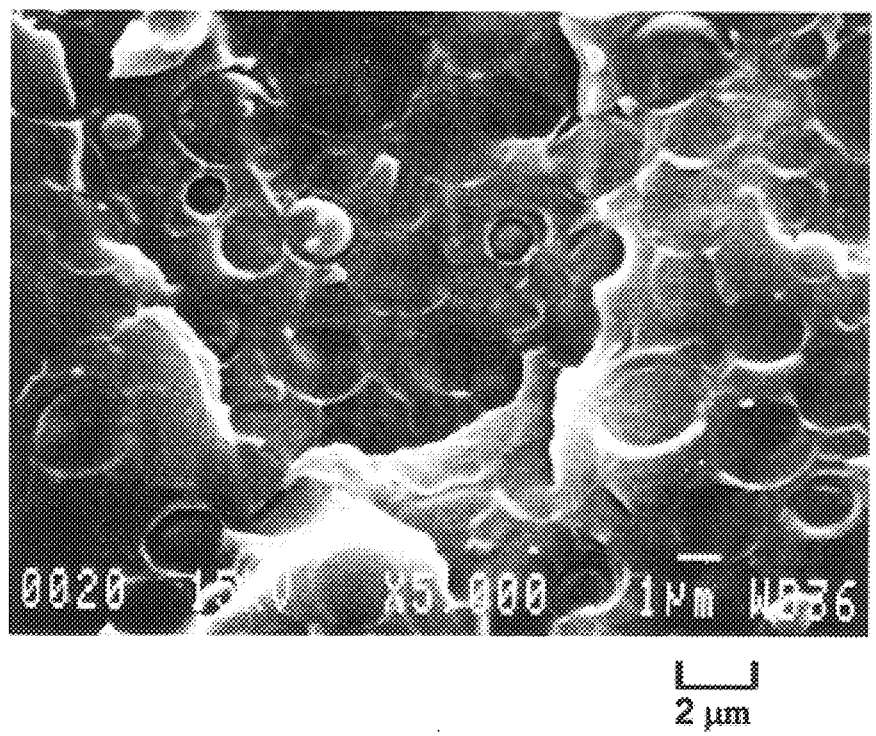
FIG. 12 is an SEM micrograph of the mixing bowl sample of the composition described in Comparative Example C11 (30 wt % Profax 6723 polypropylene/65 wt % PET/5 wt % Kraton™ FG 1901X). The magnification is 5000×.
Figure 13:
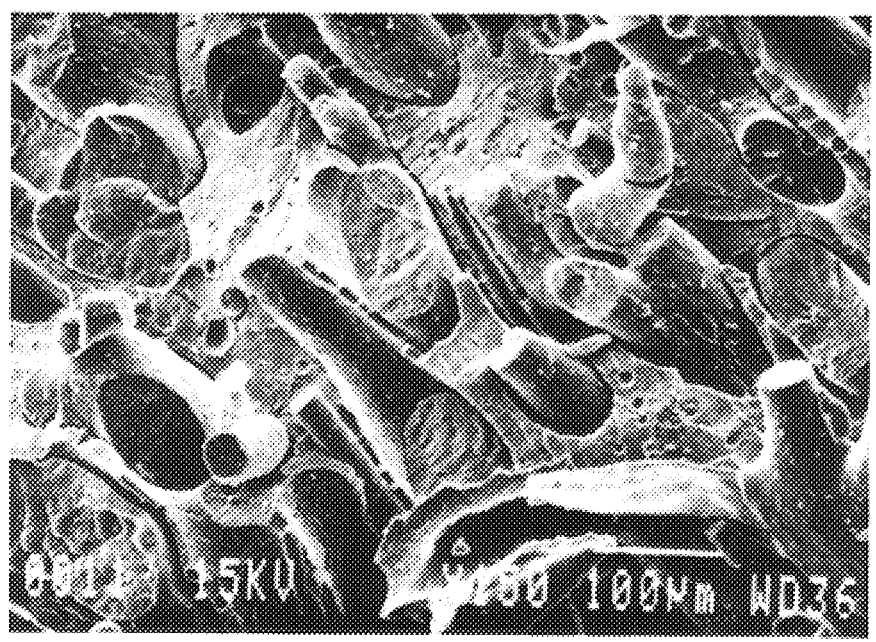
FIG. 13 is an SEM micrograph of the mixing bowl sample of the composition described in Comparative Example C12 (30 wt % Profax 6723 polypropylene/65 wt % PET/5 wt % Kraton™ 1652). The magnification is 150×.

Various modifications and alterations of this invention will become apparent to those skilled in the art without departing from the scope and spirit of this invention.

What is claimed is:

1. An extrudable thermoplastic composition, comprising:
   a thermoplastic polyester continuous phase;
   a thermoplastic polyolefin discrete phase; and
   a polyester-polyether compatibilizer;
   wherein said compatibilizer is stable at the extrusion temperature of the composition, and wherein said polyolefin is present in an amount of between about 15% to about 45% by weight of the combined weight of said continuous phase, said disperse phase, and said compatibilizer.

2. The composition of claim 1, wherein said polyolefin is present in an amount of between about 20% to about 35% by weight of the combined weight of said continuous phase, said disperse phase, and said compatibilizer.

3. The composition of claim 1, wherein said polyolefin is present in an amount of between about 25% to about 30% by weight of the combined weight of said continuous phase, said disperse phase, and said compatibilizer.

4. An extrudable thermoplastic composition comprising:
   a thermoplastic polyester continuous phase;
   a thermoplastic polyolefin discrete phase; and
   a polyester-polyether compatibilizer;
   wherein said compatibilizer is stable at the extrusion temperature of the composition, and wherein said composition comprises about 55 to about 85% by weight of said thermoplastic polyester, about 15 to about 45% by weight of said polyolefin, and about 0.01 to about 1% by weight of said compatibilizer.

5. The composition of claim 4, wherein said composition comprises about 60 to about 80% by weight of said thermoplastic polyester, about 20 to about 35% by weight of said polyolefin, and about 0.01 to about 1% by weight of said compatibilizer.

6. An extrudable thermoplastic composition, comprising:
   a thermoplastic polyester continuous phase;
   a thermoplastic polyolefin discrete phase; and
   a polyester-polyether compatibilizer;
   wherein said compatibilizer is stable at the extrusion temperature of the composition, and wherein said composition consists essentially of said thermoplastic polyester phase, said polyolefin phase, said compatibilizer, and from about 0 to about 10% by weight of dyes, pigments, or both.

7. The composition of claim 1, wherein said discrete phase is incompatible with said continuous phase.

8. The composition of claim 1, wherein said compatibilizer is a block copolymer.

9. The composition of claim 1, wherein said compatibilizer is a diblock.

10. The composition of claim 1, wherein said compatibilizer is elastomeric.

11. The composition of claim 1, wherein said compatibilizer is a block copolymer of polytetramethylene oxide and a second polymer selected from the group consisting of polybutylene terephthalate and polybutylene isophthalate.

12. The composition of claim 1, wherein said thermoplastic polyester is a condensation product of a dicarboxylic acid and a glycol.

13. The composition of claim 12, wherein said dicarboxylic acid is terephthalic acid.

14. The composition of claim 1, wherein said thermoplastic polyester is polyethylene terephthalate.

15. The composition of claim 1, wherein said polyolefin is polypropylene.

16. The composition of claim 1, wherein said thermoplastic polyester is polyethylene terephthalate and said polyolefin is polypropylene.

17. The composition of claim 1, wherein essentially all of the particles in said discrete phase have a diameter of less than 10 microns.

18. The composition of claim 1, wherein the ratio of the viscosity of said polyolefin to said thermoplastic polyester is sufficiently close to 1.0 that the composition will not fibrillate during extrusion.

19. A voided film, comprising:
   a thermoplastic polyester continuous phase;
   a thermoplastic polyolefin discrete phase; and
   a polyester-polyether compatibilizer.

20. The voided film of clam 19, wherein said polyolefin is present in an amount of between about 15% to about 45% by weight of the combined weight of said continuous phase, said disperse phase, and said compatibilizer.

21. The voided film of claim 19, wherein said compatibilizer is present at about 0.5% or less by weight based on the total weight of said thermoplastic polyester and said polyolefin.

22. The voided film of claim 19, wherein said compatibilizer is present at about 1% or less by weight, based on the weight of said thermoplastic polyester and said polyolefin.

23. The voided film of claim 19, wherein said compatibilizer is a diblock.

24. The film of claim 19, wherein said film is stretched in at least one direction to a stretch ratio within the range of about 3:1 to about 5:1.

25. The voided film of claim 19, further comprising a non-voided layer.

26. The voided film of claim 19, wherein said film is close-celled.

27. A method for preparing a voided film comprising the steps of:

(a) preparing a composition comprising (i) a thermoplastic polyester continuous phase, (ii) a thermoplastic polyolefin discrete phase, and (iii) a polyester-polyether compatible;

(b) extruding said composition into a film; and (c) orienting said film to produce voids.

28. The method of claim 27, wherein said preparation step comprises mixing in an extruder.

29. The method of claim 27, wherein the viscosity ratio of the polyester to the polyolefin is from 0.5 to 2.0 when the composition is extruded.

30. The method of claim 27, wherein the compatibilizer is stable at the conditions under which the film is extruded.

31. The method of claim 27, wherein said film is oriented by stretching in at least one direction to a stretch ratio within the range of about 3:1 to about 5:1.

* * * * *